Figure 1:
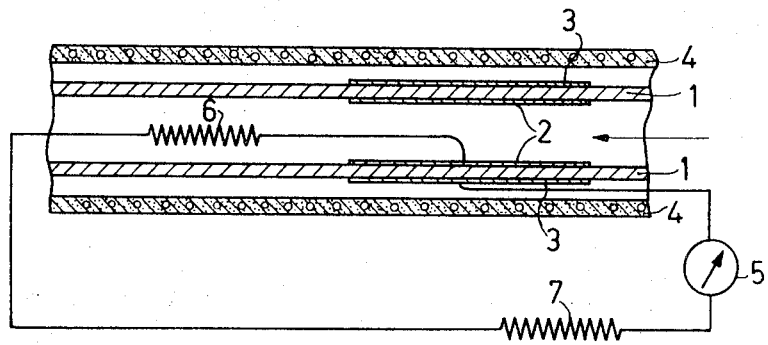

United States Patent
Heijne et al.

[15] 3,658,479
[45] Apr. 25, 1972

[54] DEVICE FOR MEASURING THE PRESSURE OF A GAS

[72] Inventors: Leopold Heijne; Nicolaas Marinus Beekmans, both of Emmasingel, Eindhoven, Netherlands

[73] Assignee: U.S. Philips Corporation, New York, N.Y.

[22] Filed: Jan. 16, 1970

[21] Appl. No.: 3,423

[30] Foreign Application Priority Data

Jan. 22, 1969 Netherlands..........................6901021

[52] U.S. Cl..............................23/254 E, 23/232 E, 73/27 R, 73/29, 204/195 P, 324/71 R
[51] Int. Cl. .........................................................G01n 7/10
[58] Field of Search................23/232 E, 254, 254 E, 255 E; 324/30, 71; 204/195 M, 195 P; 73/23, 29, 27

[56] References Cited

OTHER PUBLICATIONS

Weissbart et al., J. Electrochem. Soc. 109, 723– 726 (1962).

Primary Examiner—Morris O. Wolk
Assistant Examiner—R. E. Serwin
Attorney—Frank R. Trifari

[57] ABSTRACT

A device for measuring the partial or absolute pressure of a gas, which device includes a partition comprising a substance which shows a reversible reaction with the gas molecules and is then ion-permeable, the measurement being effected on the current which flows through a resistor between electrodes on either side of the wall, the value of the resistor being proportional to the absolute temperature.

5 Claims, 3 Drawing Figures

DEVICE FOR MEASURING THE PRESSURE OF A GAS

The invention relates to a device for measuring the partial pressure of a gaseous component in a gas mixture, or of the absolute pressure of a pure gas.

A device is known, for example, from the J. Electrochem. Soc. 109, 723–726 (1962). It comprises a partition consisting of a solid substance which shows a reversible reaction with molecules of the relevant gas and is ion-permeable. Opposite sides of the partition are provided with a thin metallic and/or semiconducting electrode layer on either side. The solid substance of the partition can be, for example, thorium oxide or stabilized zirconium oxide both of which are permeable to oxygen ions. The electrode layers or electrodes may consist of a noble metal such as platinum. When it is desired to measure the partial pressure of one of the components of the gas mixture, the gas mixture is provided on one side of the partition. A reference gas having a known constant partial pressure is provided on the other side of the partition. In the case of measuring oxygen pressures, air is preferably chosen for this reference gas.

In another embodiment the solid substance of the partition consists of silver halide with which partial pressures of the relevant halogens can be measured. The constant reference pressure can be obtained by using a silver electrode on the reference side. Such a silver halide partition, notably silver iodide, $KAg_4I_5$, $Ag_3SI$ or $RbAg_4I_5$ can be made suitable for measuring sulphur pressures by providing a layer of silver sulphide on said partition. Due to the motion of the ions between the two electrodes a voltage difference E is produced at an increased temperature and already at room temperature for some substances, which voltage difference for a biatomic gas according to the Nernst theory $E$ is $RT/2zF \ln p1/p2$ depends on the ratio between the partial pressures $p1$ and $p2$. In this equation R is the gas constant in Joules/°C., T is the absolute temperature, z is the valency of the relevant ion and F is the Faraday constant in Coulombs. The unknown pressure can directly be derived therefrom.

Since the EMF is proportional to the absolute temperature, a drawback of this device is that the temperature must be maintained accurately constant upon measurement and calibration so as to be able to derive the pressure from the observed EMF.

The device according to the invention is characterized in that the measurement is effected on the electric current which, due to the EMF occurring between the electrode layers, flows in a resistive element provided between these layers and whose resistance is proportional to the absolute temperature and which element is present in the same space of uniform or, if necessary, increased temperature, as the partition.

Due to this step the necessity of temperature stabilisation is eliminated which considerably simplifies the device.

Most of the pure metals such as copper, tungsten, molybdenum and platinum have a temperature coefficient of approximately + 0.35%/°C. at room temperature and thus meet the above-mentioned conditions of the resistance being proportional to the absolute temperature:

$$r = k_1 T.$$

and since $i = E/r$ and when the above-mentioned equation for the resistance and the Nernst comparison for E are substituted therein, it follows that:

$$i = (R/2zk_1F) \ln (P_1/P_2)$$

if it is ensured that the internal resistances of the primary cell and of the current meter relative to the resistance $r$ can be neglected. The temperature is not present in the last-mentioned equation; in addition to the current and the pressure ratio of the relative gas components on either side of the partition it only comprises known constants.

Instead of the said metal resistance it is alternatively possible to use a semiconductor for which an extrinsic semiconductor having shallow acceptors or donors is preferably chosen so that the charge carrier concentration is independent of the temperature. The mobility of the charge carriers is determined by thermal dispersion in the relevant temperature range so that the resistance is approximately proportional to $T 3/2$. An example thereof is $n$-silicon carbide. (See Van Daal, Philips Research Reports Supplement 1965, No. 3, page 25). The slightly too great temperature dependence of the resistor can be compensated for a limited range of temperatures by connecting a fixed resistor $r_1$ outside the space of even temperature in series with the resistor $r$ being present in this space.

It is alternatively possible to use a resistor having a negative temperature coefficient. In that case this resistor must be connected in parallel with the amperemeter, while it is necessary for a constant resistor outside the space of even temperature to be connected in series with the measuring device. In some embodiments of the measuring device, namely those in which the said partition consists of material having a negative temperature coefficient, the partition itself may be used as such a resistor. An example thereof is $ZrO_2$ comprising 15 mol. percent of CaO. The resistance thereof was measured by T.Y. Tien and E.C. Subbarao (J-Chem.Phys. 39, 1041 (1963)). However, it is necessary for the contacts which bound the desired part of the partition as a resistor, to be present on the same side thereof, otherwise an EMF would also be built up between these contacts and the part of the tube would then not behave as a genuine resistor.

Figure 2:
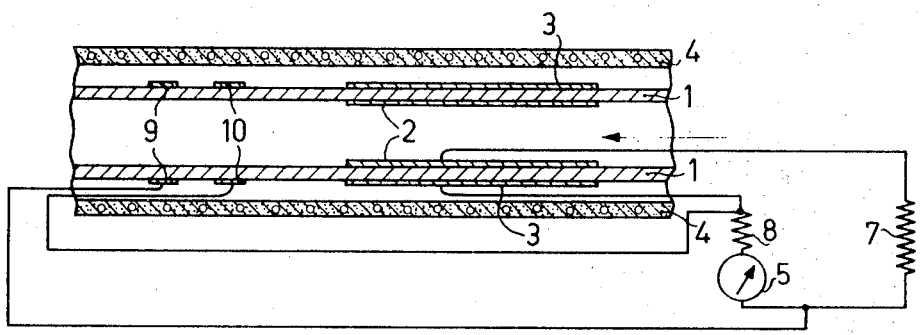
Figure 3:
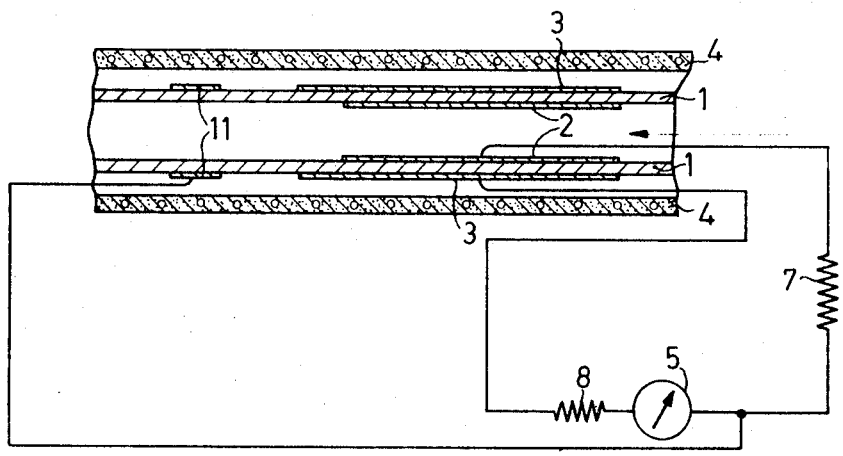

The invention will be described with reference to the accompanying drawing in which FIGS. 1, 2 and 3 show, a longitudinal section, different embodiments of the invention.

In FIG. 1 the reference numeral 1 denotes in a longitudinal section, a tube which comprises stabilised zirconium oxide, for example, zirconium oxide comprising 15 mol.% of CaO. The gas to be analyzed, for example, oxygen-containing nitrogen is entered into this tube on the right-hand side. An electrode 2 consisting of a porous platinum layer is provided on the inner side of the tube, and such an electrode 3 is provided on the outer side. These layers may be provided, for example, by cathodic sputtering. The assembly is provided in a furnace 4. Resistors 6 and 7 and an amperemeter 5 are connected between the electrodes 2 and 3. The metal resistor 6 having a value of $r$ and comprising, for example, copper is provided in the furnace in the measuring circuit. A fixed resistor 7 having a value of $r_1$ outside the furnace is used if the resistor 6 consists of a semiconductor as described above. The value of this resistor is chosen to be such that the too great temperature coefficient of the semiconductor is corrected to the correct value for the temperature range used.

In one embodiment the thickness of the platinum layer was $0.1/\mu$ and the temperature of the furnace was approximately 700° C. which temperature did not have to be stabilized, however.

In FIG. 2 the wall of the tube comprising zirconium oxide including 15 mol percent of CaO which material has a negative temperature coefficient of the resistor, is used as a resistor in a similar device. To this end, part of the tube is connected in parallel with the measuring circuit by means of the contacts 9 and 10. A further resistor 7 is provided outside the furnace in the measuring circuit, while the internal resistor of the current meter 5 is denoted by the reference numeral 8.

FIG. 3 shows a similar embodiment in which a resistive contact 11 is provided while the measuring contact 3 is also used as the other resistive contact. To this end the measuring contact 3 is somewhat elongated relative to the internal contact 2.

In one embodiment the furnace was at a temperature of 1,000° K. (730° C.)- The EMF trajectory was 300 mv. over a range of from 0.2 to $2 \times 10^{-7}$ atmospheres $O_2$. The amperemeter sensitivity was $10/\mu A$.

The value of the internal resistor 8 of the current meter was (1,000 ohms) and that of the fixed resistor 7 was 27,000 ohms. The distance between the electrodes 11 and 3 was approximately 2 cm. In this case a resistor of 14,000 ohms was isolated.

The specific resistance of the used zirconium oxide stabilised with 15 mol. percent of CaO was 500 ohm/cm. This resistance is dependent on the temperature according to $R = R_1 e^{-A/kT}$ wherein A has the value of 1.2 eV. From this follows a temperature coefficient of the value $(1/R) \cdot (dR/dT) = -(A/kT^2) = 1.4\%$ per °C. A small variation in temperature of a few degrees did not substantially result in any measuring error for the said proportioning; at a greater temperature deviation of 50 percent a measuring error was present which, however, was approximately three times as small as the error which was caused when the said compensation circuit was not used.

What is claimed is:

1. A device for measuring the partial pressure of a gaseous component in a gas mixture, comprising a chamber containing said gas mixture at a given temperature and having a partition consisting of at least one solid substance which shows a reversible reaction with molecules of said gas mixture and is then ion-permeable, electrodes are disposed on opposite sides of said partition, a resistive element in said chamber between said electrodes the resistance of which is proportional to the absolute temperature, and means in series with said resistance for measuring an electric current flowing between said electrodes as a result of an EMF produced therebetween by the gas mixture permeating said partition.

2. A device as claimed in claim 1, wherein the resistive element comprises a combination of a semiconductor provided in the chamber and a fixed resistor provided outside said space.

3. A device as claimed in claim 1, wherein the resistive element comprises a combination of a resistor having a negative temperature coefficient within the chamber, said resistor being connected in parallel with the current measuring means, and a fixed resistor external to the chamber and connected in series with the current measuring means.

4. A device as claimed in claim 3, wherein the partition consists of a material having a negative coefficient of the resistance and is connected in parallel with the current measuring means through terminals on the same side of the partition.

5. A device as claimed in claim 4 wherein the partition has one contact on one side and two contacts on the other side, the latter contacts being connected in parallel with the current measuring means and the first contact being connected thereto through a fixed resistor.

* * * * *